(12) United States Patent
Okuyama

(10) Patent No.: US 6,457,832 B1
(45) Date of Patent: Oct. 1, 2002

(54) ILLUMINATION APPARATUS AND PROJECTION APPARATUS COMPENSATING FOR TRANSVERSE ABERRATION AT AN ILLUMINATION SURFACE

(75) Inventor: Atsushi Okuyama, Tokorozawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/506,253

(22) Filed: Feb. 17, 2000

(30) Foreign Application Priority Data

Feb. 19, 1999 (JP) ............................... 11-041155

(51) Int. Cl.$^7$ .................. G03B 21/14; G03B 21/00; G03B 21/20; G03B 9/00; G02F 1/1335
(52) U.S. Cl. ........................ 353/38; 353/20; 353/69; 353/102; 349/5; 349/9; 359/443; 359/651
(58) Field of Search ....................... 353/20, 69, 70, 353/102, 38; 349/9, 5, 6, 7, 8; 359/649, 651, 237, 443

(56) References Cited

U.S. PATENT DOCUMENTS

| | | | |
|---|---|---|---|
| 4,947,030 A | * 8/1990 | Takahashi | 350/201.1 |
| 5,073,013 A | 12/1991 | Sonehara et al. | 359/63 |
| 5,098,184 A | 3/1992 | van den Brandt et al. | 353/102 |
| 5,626,409 A | 5/1997 | Nakayama et al. | 353/31 |
| 5,808,805 A | * 9/1998 | Takahashi | 359/651 |
| 6,008,948 A | * 12/1999 | Togino | 359/637 |
| 6,193,376 B1 | * 2/2001 | Hayashi et al. | 353/30 |
| 6,273,569 B1 | * 8/2001 | Iechika et al. | 353/38 |
| 2002/0024743 A1 | * 2/2002 | Endo et al. | 359/643 |

FOREIGN PATENT DOCUMENTS

| | | |
|---|---|---|
| JP | 63-116123 | 5/1988 |
| JP | 2505758 | 2/1996 |

* cited by examiner

*Primary Examiner*—Russell Adams
*Assistant Examiner*—Melissa J Koval
(74) *Attorney, Agent, or Firm*—Morgan & Finnegan, LLP

(57) ABSTRACT

An illumination apparatus is constructed to illuminate an effective range of a surface, rectangular in shape, to be illuminated with light from a light source via a first lens array, a second lens array, and a condensing optical system. Wherein the illumination apparatus satisfies conditions defined by the length along a longitudinal direction of the area to be illuminated, a length along a transverse direction thereof, a focal length of individual lenses forming the second lens array, a focal length of the optical system, a width of transverse aberration caused by the optical system in the longitudinal direction against an object at infinity, a width of transverse aberration caused by the optical system in the transverse direction, a length along a longitudinal direction of individual lenses of the first array, and a length along a transverse direction of the lenses of the first lens array.

14 Claims, 12 Drawing Sheets

ILLUMINATION APPARATUS AND PROJECTION APPARATUS COMPENSATING FOR TRANSVERSE ABERRATION AT AN ILLUMINATION SURFACE

BACKGROUND OF THE INVENTION

1. Field of the Invention

The present invention relates to an illumination apparatus and a projection apparatus having it and, more particularly, to those suitably applicable to liquid crystal projectors, for example, of a single panel type or a three panel type capable of implementing illumination with high uniformity and with little illuminance unevenness on a projection screen.

2. Related Background Art

A variety of proposals have been made heretofore as to the technology of projectors constructed to enlarge and project an image formed on a display element such as liquid-crystal light valves (a liquid crystal panel) or the like, onto a display surface such as a screen or the like.

The liquid crystal projectors are constructed to illuminate a liquid crystal display element with light from an illumination system and enlarge and project light with image information, modulated by the liquid crystal light valves and transmitted by the element, through a projection lens onto the screen. In the case of U.S. Pat. No. 5,098,184, for example, an integrator comprised of a combination of two lens arrays set in series, as illustrated in FIG. 12, was used as a means for uniforming the light amount distribution of the illumination light on the liquid crystal display element.

In FIG. 12, reference numeral 101 designates a white light source, 102 a condenser lens system which is a combination of a mirror with a lens, 103 a first lens array consisting of a plurality of lenses, 104 a second lens array consisting of a plurality of lenses, 105 a condenser lens, 106 a condenser lens, 107 a liquid crystal panel, and 108 a projection lens. In this illumination system, light from the condenser lens system 102 is separated into a plurality of beams in the first lens array 103, and the plurality of beams separated are made to overlap each other on the liquid crystal panel 107 by the second lens array and the relay lens system consisting of the condenser lens 105 and the condenser lens 106, whereby an almost uniform illumination area is created on the liquid crystal panel 107. Since the shape of this illumination area is similar to the shape of the individual lenses of the first lens array 103, the outline shape of the individual lenses of the first lens array 103 is normally a rectangular shape similar to the shape of the liquid crystal panel 107, so as to lay the illumination area on the liquid crystal panel.

In the illumination system of FIG. 12, let Df1 be the size of the first fly's eye lens 103, D1 be the size of the liquid crystal panel 107, ff2 be the focal length of the individual lenses of the second lens array 104, fi be the focal length of the condenser lens 105, and Mc be a magnification of the condenser lens 106 acting on the light from the condenser lens 105. Then the following relation is met:

$$Df1=(D1/Mc)\times(ff2/fi)=D1\times ff2/fr \quad (a1).$$

Here fr=Mc×fi, which is the composite focal length of the relay lens system. In the illumination system illustrated in FIG. 12, each of the condenser lenses is a lens having a positive refracting power. If these lenses are spaced with an unrepresented color separation system in between it will be difficult to correct well for curvature of field appearing in this relay lens system and transverse aberration will appear in the periphery of the optical system. In the structure as defined by above Eq. (a1), there occurs deviation between the beams superimposed in the illumination area because of transverse aberration remaining in the relay lens system, which poses a problem of illumination nonuniformity in the edge part of the illumination area.

SUMMARY OF THE INVENTION

An object of the present invention is to provide an illumination apparatus and a projection apparatus capable of illuminating a surface to be illuminated, more uniformly than before.

An illumination apparatus according to one aspect of the present invention is an illumination apparatus for illuminating an area to be illuminated, of a rectangular shape with light from a light source via a first lens array, a second lens array, and a condensing optical system arranged in the stated order from the side of the light source, the illumination apparatus satisfying the following conditions:

$$Dfx > (Dpx + \delta x) \times ff2/fr$$

$$Dfy > (Dpy + \delta y) \times ff2/fr$$

where Dpx is a length along a longitudinal direction of said area to be illuminated, Dpy is a length along a transverse direction thereof, ff2 is a focal length of individual lenses forming the second lens array, fr is a focal length of said optical system, δx is a width of transverse aberration in said longitudinal direction against an object at infinity, caused by the optical system, δy is a width of transverse aberration in said transverse direction, caused by the optical system, Dfx is a length along a longitudinal direction of individual lenses of the first lens array, and Dfy is a length along a transverse direction of the lenses of the first lens array.

Another illumination apparatus according to a further aspect of the present invention is an illumination apparatus for illuminating an area to be illuminated, of a rectangular shape with light from a light source via a first lens array, a second lens array, and a condensing optical system arranged in the stated order from the side of the light source, the illumination apparatus satisfying the following conditions:

$$Dfx > (Dpx + \delta x) \times Sr$$

$$Dfy > (Dpy + \delta y) \times Sr$$

where Dpx is a length along a longitudinal direction of said area to be illuminated, Dpy is a length along a transverse direction thereof, Sr=L2/L1 wherein L1 is a distance from the first lens array to a position of a principal point on the side of said light source, of a composite system of the second lens array and the condensing optical system and L2 is a distance from a position of a principal point on the side of said area to be illuminated, of said composite system to said area to be illuminated, δx is a width of transverse aberration in said longitudinal direction against an object at infinity, caused by said condensing optical system, δy is a width of transverse aberration in said transverse direction, caused by said condensing optical system, Dfx is a length along a longitudinal direction of individual lenses of the first lens array, and Dfy is a length along a transverse direction of the lenses of the first lens array.

Another illumination apparatus according to a further aspect of the present invention is an illumination apparatus for illuminating an area to be illuminated, of a rectangular shape with light from a light source via a first lens array, a second lens array, and a condensing optical system arranged in the stated order from the side of the light source, wherein when weighted mean widths of transverse aberration are computed by the following equations:

$$\overline{\delta x} = 2\left(\frac{\sum_i \delta xi^2 \cdot Epi}{\sum_i Epi}\right)^{1/2}$$

$$\overline{\delta y} = 2\left(\frac{\sum_j \delta yj^2 \cdot Epj}{\sum_j Epj}\right)^{1/2}$$

where δx is a width of transverse aberration in said longitudinal direction against an object at infinity, caused by said optical system, δy is a width of transverse aberration in said transverse direction, caused by said optical system, Ep is a normalized intensity distribution at an entrance pupil of said optical system, δxi is a transverse aberration amount of a ray passing a center of the i-th lens, when counted from an end in said longitudinal direction, out of individual lenses forming said first lens array at the time of incidence to the pupil of said condensing optical system, δyj is a transverse aberration amount of a ray passing a center of the j-th lens in the transverse direction out of the individual lenses forming the first lens array at the time of incidence to the pupil of said condensing optical system, and Epi and Epj are intensities of the pupil at respective pupil positions where the transverse aberration amounts δxi, δyj are computed;

a length Dfx along a longitudinal direction and a length Dfy along a transverse direction of the individual lenses of said first lens array satisfy the following conditions:

$Dfx > (Dpx + \overline{\delta x}) \times ff2/fr$ $Dfy > (Dpy + \overline{\delta y}) \times ff2/fr$ where Dpx is a length along a longitudinal direction of said area to be illuminated, Dpy is a length along a transverse direction thereof, ff2 is a focal length of individual lenses forming the second lens array, fr is a focal length of said optical system.

Another illumination apparatus according to a further aspect of the present invention is an illumination apparatus for illuminating an area to be illuminated, of a rectangular shape with light from a light source via a first lens array, a second lens array, and a condensing optical system arranged in the stated order from the side of the light source, wherein when weighted mean widths of transverse aberration are computed by the following equations:

$$\overline{\delta x} = 2\left(\frac{\sum_i \delta xi^2 \cdot Epi}{\sum_i Epi}\right)^{1/2}$$

$$\overline{\delta y} = 2\left(\frac{\sum_j \delta yj^2 \cdot Epj}{\sum_j Epj}\right)^{1/2}$$

where δx is a width of transverse aberration in said longitudinal direction against an object at infinity, caused by said condensing optical system, δy is a width of transverse aberration in said transverse direction, caused by said condensing optical system, Ep is a normalized intensity distribution at an entrance pupil of said optical system, δxi is a transverse aberration amount of a ray passing a center of the i-th lens, when counted from an end in said longitudinal direction, out of individual lenses forming said first lens array at the time of incidence to the pupil of said condensing optical system, δyj is a transverse aberration amount of a ray passing a center of the j-th lens in the transverse direction out of the individual lenses forming the first lens array at the time of incidence to the pupil of said condensing optical system, and Epi and Epj are intensities of the pupil at respective pupil positions where the transverse aberration amounts δxi, δyj are computed;

a length Dfx along a longitudinal direction and a length Dfy along a transverse direction of the individual lenses of said first lens array satisfy the following conditions:

$Dfx > (Dpx + \overline{\delta x}) \times Sr$ $Dfy > (Dpy + \overline{\delta y}) \times Sr$, where Dpx is a length along a longitudinal direction of said area to be illuminated, Dpy is a length along a transverse direction thereof, Sr=L2/L1 wherein L1 is a distance from the first lens array to a position of a principal point on the side of said light source, of a composite system of the second lens array and the condensing optical system and L2 is a distance from a position of a principal point on the side of said area to be illuminated, of said composite system to said area to be illuminated.

Another illumination apparatus according to a further aspect of the present invention is an illumination apparatus for illuminating a surface to be illuminated, with a plurality of beams, which are superimposed on said surface, wherein said surface is illuminated so that a portion of illumination nonuniformity due to deviation of illumination areas illuminated by the respective beams can be made outside said surface (an effective range).

Another illumination apparatus according to a further aspect of the present invention is an illumination apparatus for illuminating a surface to be illuminated, with a plurality of beams, which are superimposed on said surface, wherein said surface is illuminated so that a portion of illumination nonuniformity due to deviation of illumination areas illuminated by the respective beams can be made outside said surface (an effective range), said deviation occurring because of transverse aberration of an optical system, for example.

Another illumination apparatus according to a further aspect of the present invention is an illumination apparatus for illuminating an area to be illuminated, of a rectangular shape with light from a light source via a first lens array, a second lens array, and a condensing optical system arranged in the stated order from the side of the light source, wherein a portion of illumination nonuniformity due to deviation of illumination areas by respective lenses of said lens arrays, said deviation occurring because of transverse aberration of said condensing optical system, is made outside the area to be illuminated (an effective range).

A projection apparatus according to a further aspect of the present invention is a projection apparatus wherein a display element with said surface to be illuminated is illuminated by either one of the above illumination apparatus and wherein

DETAILED DESCRIPTION OF THE PREFERRED EMBODIMENTS

Figure 1:
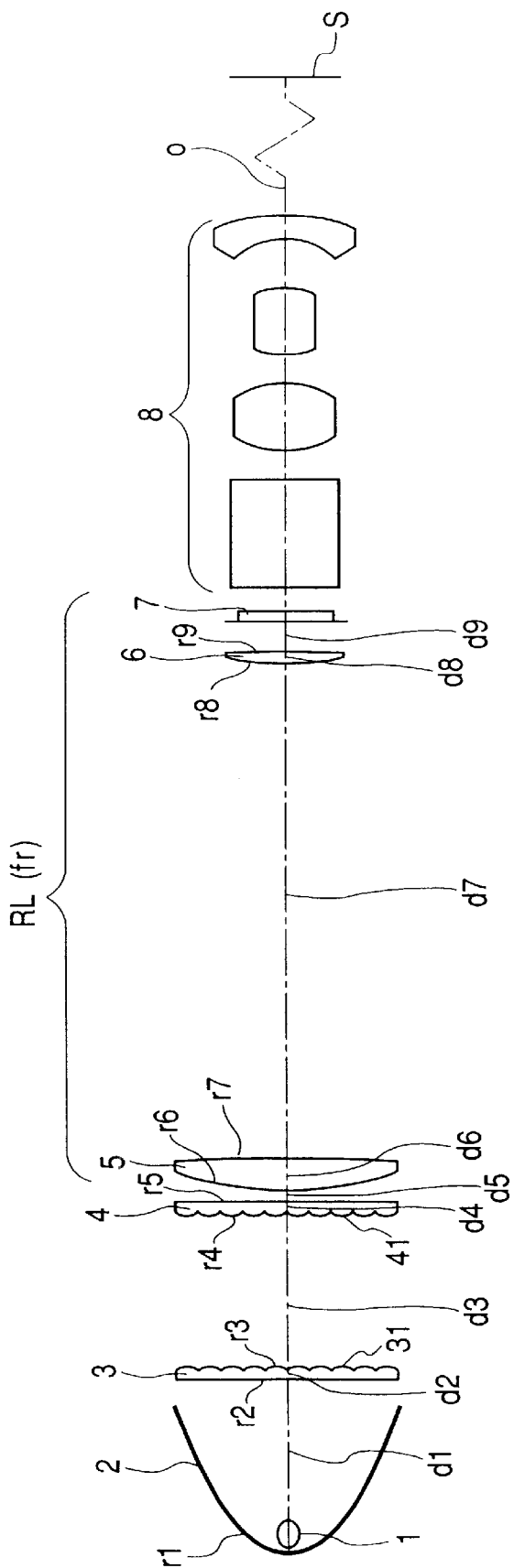
FIG. 1 is a schematic diagram to show the major part of Embodiment 1 of the present invention.

FIG. 1 is a schematic diagram to show the major part of Embodiment 1 of the present invention, in which the present invention is applied to the liquid crystal projector of the single panel type. This single panel liquid crystal projector is arranged to illuminate the liquid crystal display element 7 of a single panel by an illumination optical system to form an image (light) by the element 7 and enlarge and project the image through the projection lens 8 onto a screen or onto a wall.

In the figure, reference numeral 1 designates a light source, such as a metal halide lamp or the like, for radiating white light, and 2 a reflector having a concave reflecting surface, such as an ellipsoidal surface, a parabolic surface, or the like, for efficiently reflecting the light from the light source 1. The reflector 2 illustrated, which is a parabolic mirror herein, reflects the light from the light source 1 to convert it into parallel light, and makes this parallel light incident into the first lens array 3. The first lens array 3 has a plurality of lenses each having a positive refracting power. Numeral 4 denotes a second lens array, and individual lenses of this lens array 4 are lenses having a positive refracting power and arranged in 1:1 correspondence to the individual lenses of the first lens array 3. Each of the first and second lens arrays is a lens array plate in which the front shape of the individual lenses is similar to the illuminated area of the display element 7. The first lens array 3 forms a plurality of secondary light sources on the second lens array 4.

Numeral 5 represents a condenser lens, which has a positive refracting power. Numeral 6 indicates a condenser lens, which condenses the illumination light through the liquid crystal display element 7 onto the entrance pupil (aperture stop) of the projection lens 8. The condenser lens 5 and the condenser lens 6 compose a relay lens system (a lens system) RL. Numeral 7 denotes a liquid crystal display element consisting of a liquid crystal panel of the twisted nematic type. The projection lens 8 has a positive refracting power and it enlarges and projects the image formed by the display element 7, onto the screen or wall S.

In the present embodiment, the second lens array 4 is placed at the rear focus position of the first lens array 3 and the first lens array 3 is placed at the front focus position of the second lens array 4. Therefore, the light condensed by the first lens array 3 is focused near the second lens array 4. The light thus forms a plurality of light source images as the aforementioned plurality of secondary light sources and the light exit side of the second lens array 4 is telecentric.

Now let us define Dpx as the longitudinal length along the long side of the liquid crystal display element 7, Dpy as the transverse length along the short side thereof, ff2 as the focal length of each lens forming the second lens array 4, and fr as the focal length of the relay lens system (the condenser lens 5 and the condenser lens 6) RL. The image magnification Mr by the second lens array 4 and the relay lens system RL can be expressed by Mr=ff2/fr, using the focal lengths thereof. Further, let δx be the width of transverse aberration in the longitudinal direction (long side) of the liquid crystal display element 7 against an object at infinity, of the relay lens system RL, and δy be the width of transverse aberration in the transverse direction (short side). Then the longitudinal length Dfx and the transverse length Dfy of the individual lenses of the first lens array 3 are set so as to satisfy the following conditions.

$$Dfx > (Dpx+\delta x) \times ff2/fr = (Dpx+\delta x) \times Mr \quad (1)$$

$$Dfy > (Dpy+\delta y) \times ff2/fr = (Dpy+\delta y) \times Mr \quad (2)$$

This causes the portion of the illumination nonuniformity due to the deviation of the illumination area illuminated by the beams from the respective secondary light sources, which is caused by the transverse aberration of the relay lens system RL, to be formed outside the effective range (image display range) of the liquid crystal display element 7, whereby the effective range of the display element 7 can be illuminated uniformly. This allows the image to be displayed with good quality on the screen.

Upper limits of above Conditions (1), (2) are preferably set 1.15 times the lower limits and more preferably 1.1 times the lower limits. An upper limit of each condition described below is also defined in the like manner.

Further, in the present embodiment, letting Dpx be the longitudinal length along the long side of the illuminated surface on the liquid crystal display element 7, Dpy be the transverse length along the short side thereof, Sr=L2/L1 where L1 is the distance from the lens surface of the first lens array 3 to the position of the light-source-1-side principal point of the composite system of the second lens array 4 and the relay lens system RL and L2 is the distance from the position of the liquid-crystal-display-element-7-side principal point of the composite system of the second lens array 4 and the relay lens system RL to the illuminated surface on the liquid crystal display element 7, δx be the width of the transverse aberration in the longitudinal direction (long side) of the liquid crystal display element 7 against the object at infinity, of the relay lens system RL, and δy be the width of the transverse aberration in the transverse direction (short side) of the liquid crystal display element 7, the longitudinal length Dfx and the transverse length Dfy of the individual lenses of the first lens array 3 are set so as to satisfy the following conditions.

$$Dfx > (Dpx + \delta x) \times Sr \quad (3)$$

$$Dfy > (Dpy + \delta y) \times Sr \quad (4)$$

This causes the portion of the illumination nonuniformity due to the deviation of the illumination area illuminated by the beams from the respective secondary light sources, which is caused by the transverse aberration of the relay lens system RL, to be formed outside the effective range (image display range) of the liquid crystal display element 7, whereby the effective range of the display element 7 can be illuminated uniformly. This allows the image to be displayed with good quality on the screen. Here the transverse aberration by the relay lens system RL is desirably the maximum among aberration amounts, where the transverse aberration appearing on the edges of the long and short sides of the liquid crystal panel 7 is evaluated in the form of separate components in the longitudinal direction and in the transverse direction.

Since the amount of the light transmitted by the liquid crystal. display element 7 and forming the image decreases with increase in the illumination area outside the effective range, it is preferable to construct the system as follows, in order to obtain an illuminance distribution securing some light amounts while being practically acceptable, on the display element 7. Let Ep be a normalized light intensity distribution at the entrance pupil of the relay lens system RL, $\delta xi$ be a transverse aberration amount of a ray passing the center of the i-th lens, when counted from a longitudinal end, out of the individual lenses forming the first lens array 3, at the time of incidence to the entrance pupil of the relay lens system RL, $\delta yj$ be a transverse aberration amount of a ray passing the center of the j-th lens, when counted from a transverse end, out of the individual lenses forming the first lens array 3, at the time of incidence to the entrance pupil of the relay lens system RL, and Epi and Epj be intensities (of light) of the pupil at the points thereon where $\delta xi$ and $\delta yj$ are calculated. Further, let us define weighted mean widths of transverse aberration as follows.

$$\overline{\delta x} = 2\left(\frac{\sum \delta xi^2 \cdot Epi}{\sum Epi}\right)^{1/2} \quad (5)$$

$$\overline{\delta y} = 2\left(\frac{\sum \delta yj^2 \cdot Epj}{\sum Epj}\right)^{1/2} \quad (6)$$

Then the system is constructed preferably to satisfy the following conditions.

$$Dfx > (Dpx + \overline{\delta x}) \times ff2/fr = (Dpx + \overline{\delta x}) \times Mr \quad (7)$$

$$Dfy > (Dpy + \overline{\delta y}) \times ff2/fr = (Dpy + \overline{\delta y}) \times Mr \quad (8)$$

or $$Dfx > (Dpx + \overline{\delta x}) \times Sr \quad (9)$$

$$Dfy > (Dpy + \overline{\delta y}) \times Sr \quad (10)$$

Figure 10:
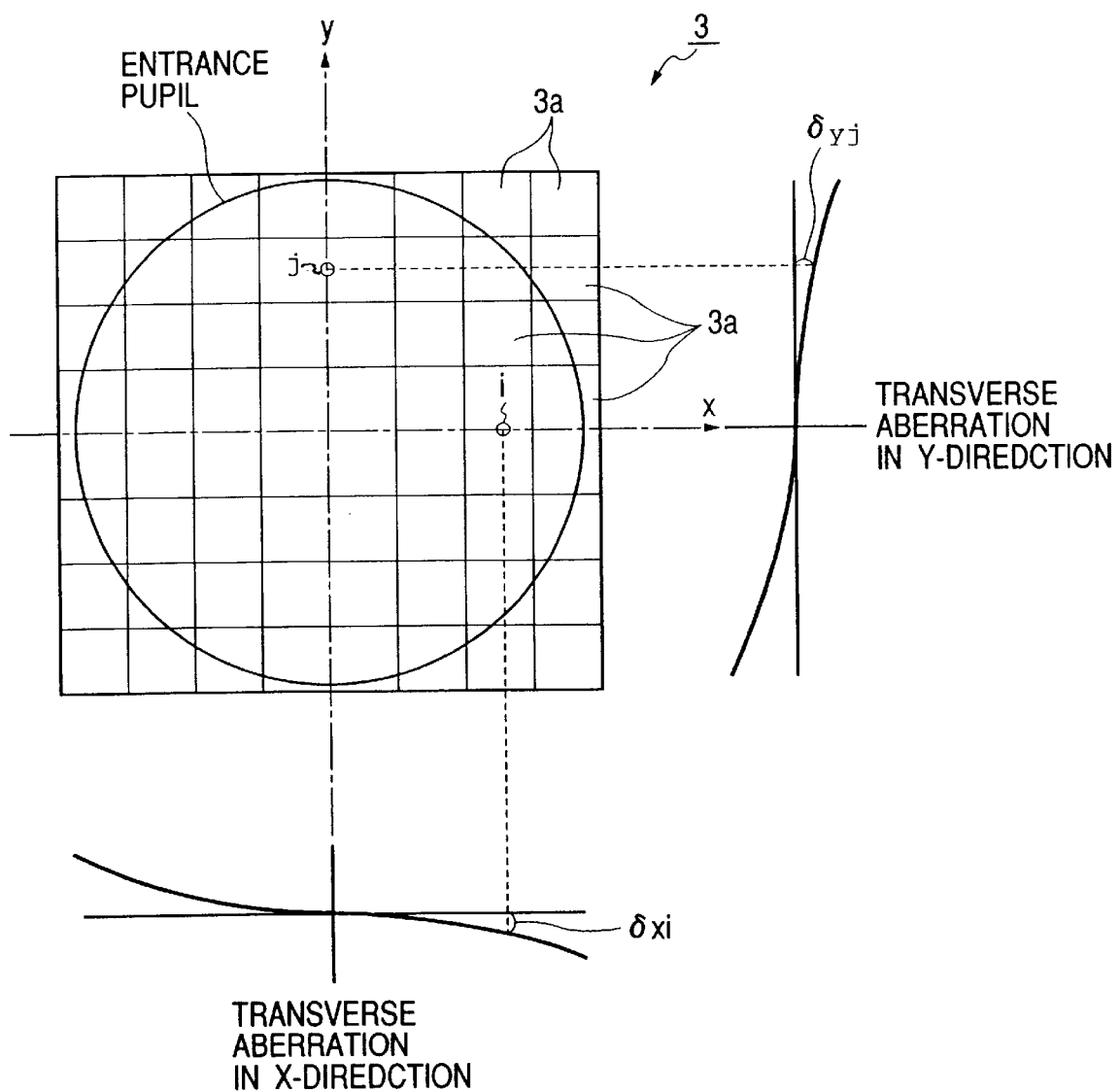
FIG. 10 is an explanatory diagram to explain aberration in the x-direction and in the y-direction.

FIG. 10 shows the relationship between the plurality of lenses 3a of the first lens array 3 and the transverse aberration amounts $\delta xi$, $\delta yj$ at the positions (i, j) on the xy coordinate system set on the entrance pupil of the relay lens system.

In cases wherein the first lens array 3 is located at a position shifted from the front focus position of the second lens array 4 and thus the light exit side of the second lens array 4 is not telecentric, the system can be constructed preferably so as to satisfy the following conditions similarly, using the image magnifucation Mr' concerning the display element 7, which is computed assuming that the lenses of the second lens array 4 and the relay lens system RL are on the same optical axis.

$$Dfx > (Dpx + \delta x) \times Mr' \quad (11)$$

$$Dfy > (Dpy + \delta y) \times Mr' \quad (12)$$

or $$Dfx > (Dpx + \overline{\delta x}) \times Mr' \quad (13)$$

$$Dfy > (Dpy + \overline{\delta y}) \times Mr' \quad (14)$$

Further, in cases wherein the liquid crystal display element 7 is located at a position shifted in the direction of the optical axis from the paraxial image point position concerning the object at infinity by the relay lens system RL, if the light exit side of the second lens array 4 is telecentric, the system can be constructed preferably so as to satisfy the following conditions, where $\sigma$ represents a deviation amount of the liquid crystal display element 7 in the optical-axis direction from the rear focus position of the relay lens system RL, which is equivalent to the above paraxial image point position.

$$Dfx > (Dpx + \delta x) \times ff2/(fr - \sigma) = (Dpx + \delta x) \times fr/(fr - \sigma) \times Mr' \quad (15)$$

$$Dfy > (Dpy + \delta y) \times ff2/(fr - \sigma) = (Dpy + \delta y) \times fr/(fr - \sigma) \times Mr' \quad (16)$$

or $$Dfx > (Dpx + \overline{\delta x}) \times ff2/(fr - \sigma) = (Dpx + \overline{\delta x}) \times fr/(fr - \sigma) \times Mr' \quad (17)$$

$$Dfy > (Dpy + \overline{\delta y}) \times ff2/(fr - \sigma) = (Dpy + \overline{\delta y}) \times fr/(fr - \sigma) \times Mr' \quad (18)$$

In cases wherein the light exit side of the second lens array 4 is not telecentric as to imaging of the first lens array 3, the system can be constructed preferably so as to satisfy the following conditions, defining hr as the distance from the principal point position on the liquid crystal display element 7 side in the optical system including the second lens array 4, to the paraxial image point position.

$$Dfx > (Dpx + \delta x) \times fr/(hr - \sigma) \times Mr'' \quad (19)$$

$$Dfy > (Dpy + \delta y) \times fr/(hr - \sigma) \times Mr'' \quad (20)$$

or $$Dfx > (Dpx + \overline{\delta x}) \times fr/(hr - \sigma) \times Mr'' \quad (21)$$

$$Dfy > (Dpy + \overline{\delta y}) \times fr/(hr - \sigma) \times Mr'' \quad (22)$$

In these equations, Mr" represents the image magnification concerning the display element 7, computed assuming that the lenses of the second lens array 4 and the relay lens system RL are on the same optical axis. If the following relations are employed, $$Mr' = fr/(fr - \sigma) \times Mr'' \quad (23)$$

or $$Mr' = fr/(hr - \sigma) \times Mr'' \quad (24)$$

then the conditions above can be expressed in the same forms as in the cases wherein the liquid crystal panel 7 is located at the paraxial image point position.

Next, a numerical example (lens data) of the illumination optical system of Embodiment 1 is presented in Table-1.

TABLE 1

| reflector | | | | | |
|---|---|---|---|---|---|
| r1 | 14 | d1 | 65.14 | n1 | reflection |
| k1 | −1 | | | | |
| first lens array | | | | | |
| r2 | 0 | d2 | 3 | n2 | 1.516 |
| r3 | −25 | d3 | 48.29 | | |
| second lens array | | | | | |
| r4 | 25 | d4 | 3 | n4 | 1.516 |
| r5 | 0 | d5 | 5 | | |
| condenser lens 5 | | | | | |
| r6 | 112.653 | d6 | 11 | n6 | 1.516 |
| k6 | −0.874 | | | | |
| r7 | −826.624 | d7 | 170 | | |
| condenser lens 6 | | | | | |
| r8 | 98 | d8 | 4 | n8 | 1.516 |
| r9 | 0 | d9 | 12 | | |

In Table-1, r indicates a radius of curvature of each optical element, which is a radius of curvature of the individual lenses 31 or 41 forming each lens array in the case of the first and second lens arrays 3, 4, d a surface separation on the optical axis o of each optical element, which is a separation between vertices of the individual lenses 31, 41 forming each lens array and the next surface in the case of the first and second lens arrays 3, 4, and n a refractive index of a material of each optical element.

The shape of aspherical surfaces of the reflector 2 and the condenser lens 5 can be expressed by the following equation (25) where Z represents coordinates in the direction of the optical axis o and h coordinates in the direction normal to the optical axis, and k in Table-1 corresponds to the parameter in this Eq. (25).

$$Z=ch^2/[1+\{1-(1+k)c^2h^2\}^{1/2}] \quad (25)$$
$$c=1/r$$

Figure 2:
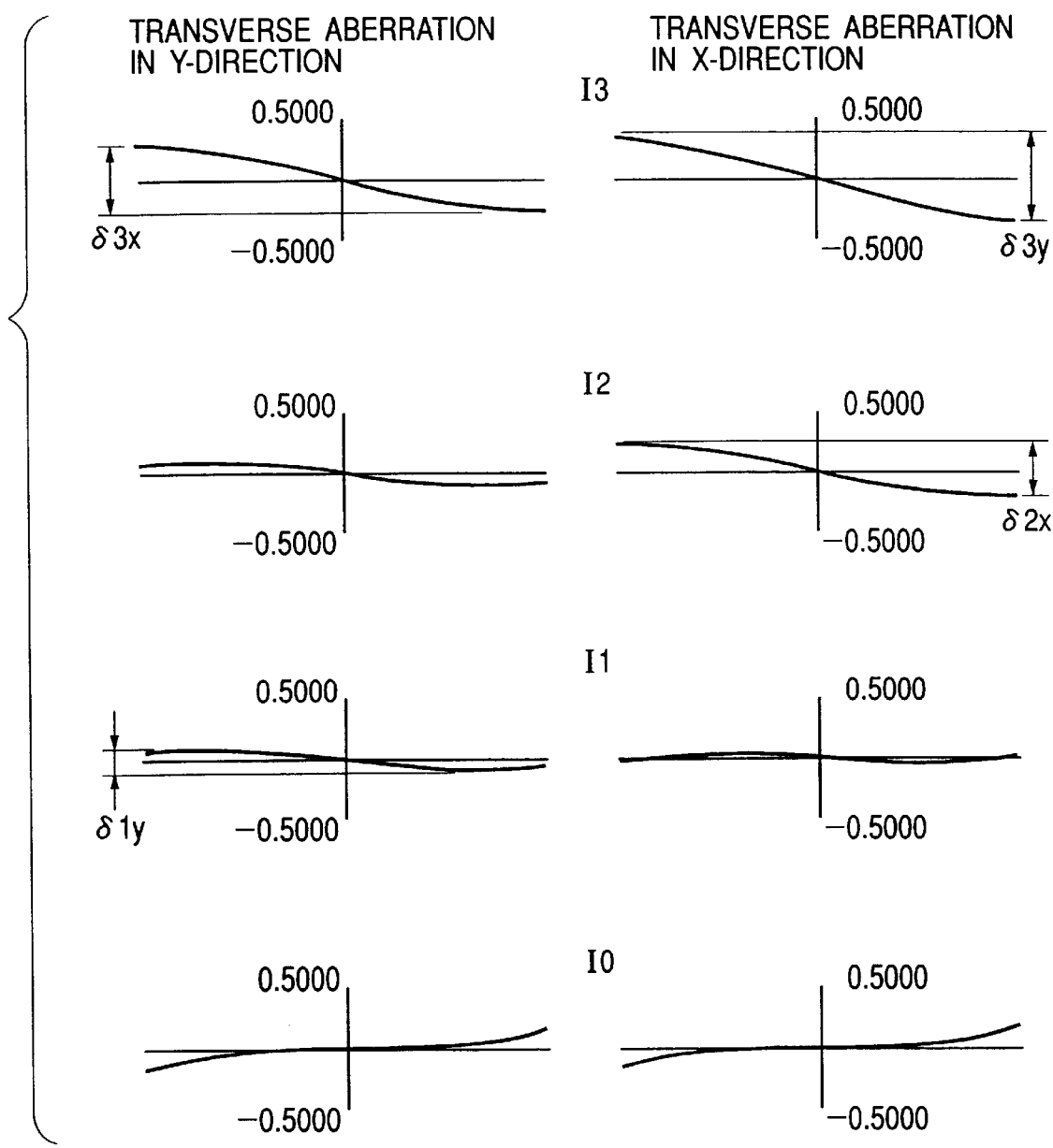
FIG. 2 is an aberration diagram of the relay lens system of FIG. 1.
Figure 3:
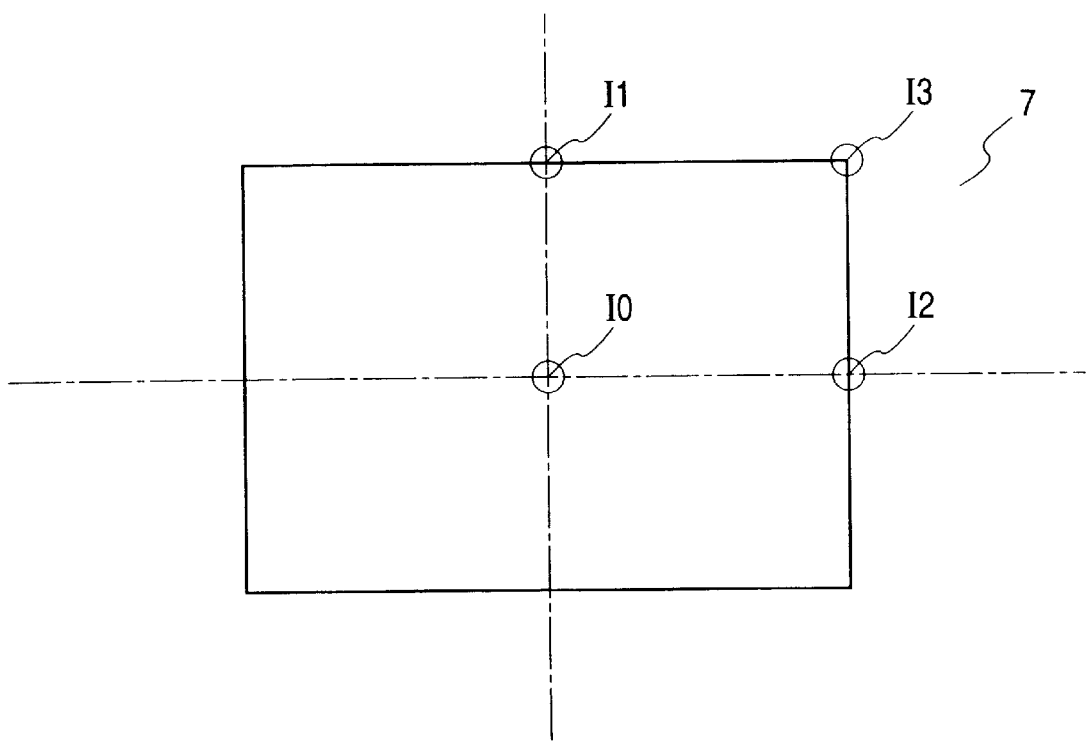
FIG. 3 is an explanatory diagram to explain the image plane of FIG. 1.

FIG. 2 shows an aberration diagram of transverse aberration in the lateral direction (the x-direction) and in the vertical direction (the y-direction) of the liquid crystal display element against the object at infinity, which is caused by the relay lens system RL composed of the condenser lens 5 and the condenser lens 6 in the present numerical example. Positions of respective image heights are the position 10 on the optical axis, the position I1 at the vertical edge, the position 12 at the lateral edge, and the position I3 at the diagonal edge on the liquid crystal display element 7 illustrated in FIG. 3. Now let $\delta 2x$, $\delta 3x$, $\delta 1y$, and $\delta 3y$ be transverse aberration amounts in the lateral direction and in the vertical direction at the vertical edge I1, at the lateral edge I2, and at the diagonal edge I3, and then they are as follows.

$\delta 2x=0.422$ mm
$\delta 3x=0.661$ mm
$\delta 1y=0.157$ mm
$\delta 3y=0.538$ mm Thus the maximums in the lateral direction and in the vertical direction, $\delta x$ and $\delta y$, are determined as follows.

$\delta x=0.661$ mm
$\delta y=0.538$ mm

Here the focal length ff2 of the lenses 41 forming the second lens array 4 and the focal length fr of the relay lens system RL are given as follows from the lens data.

ff2=48.3 mm
fr=168.9 mm

Assuming the diagonal length of the liquid crystal display element is 1.3 inches and the aspect ratio thereof is 3:4, the lateral length Dpx and the vertical length Dpy of the liquid crystal display element are calculated as follows.

Dpx=26.41 mm
Dpy=19.82 mm

From these data, the size of the first lens array 3 is set as follows from Eqs. (1), (2), where the lateral lengths are Dfx, Dfy.

Dfx>7.74 mm
Dfy>5.82 mm

Figure 4:
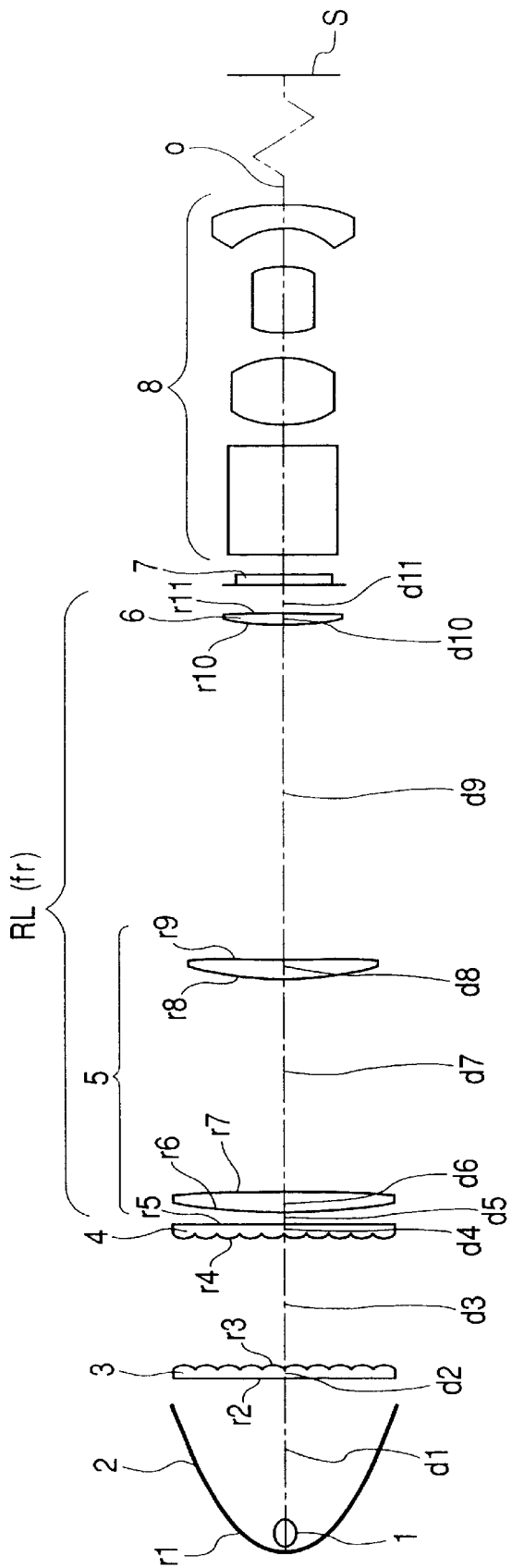
FIG. 4 is a schematic diagram to show the major part of Embodiment 2 of the present invention.

FIG. 4 is a schematic diagram to show the major part of Embodiment 2 of the present invention and shows a liquid crystal projector. Embodiment 2 is different from Embodiment 1 of FIG. 1 only in that the condenser lens 5 is composed of two lenses without using any aspherical surface, and the other structure is the same. Lens data in a numerical example of the present embodiment is presented in Table-2.

TABLE 2

| reflector | | | | | |
|---|---|---|---|---|---|
| r1 | 14 | d1 | 65.14 | n1 | reflection |
| k1 | −1 | | | | |
| first lens array | | | | | |
| r2 | 0 | d2 | 3 | n2 | 1.516 |
| r3 | −25 | d3 | 48.29 | | |
| second lens array | | | | | |
| r4 | 25 | d4 | 3 | n4 | 1.516 |
| r5 | 0 | d5 | 5 | | |
| lens 1 of condenser lens 5 | | | | | |
| r6 | 227.789 | d6 | 6 | n6 | 1.516 |
| r7 | −2265.803 | d7 | 80 | | |
| lens 2 of condenser lens 5 | | | | | |
| r8 | 138.202 | d8 | 6 | n8 | 1.516 |
| r9 | 0 | d9 | 125 | | |
| condenser lens 6 | | | | | |
| r10 | 98 | d10 | 4 | n10 | 1.516 |
| r11 | 0 | d11 | 12 | | |

Figure 5:
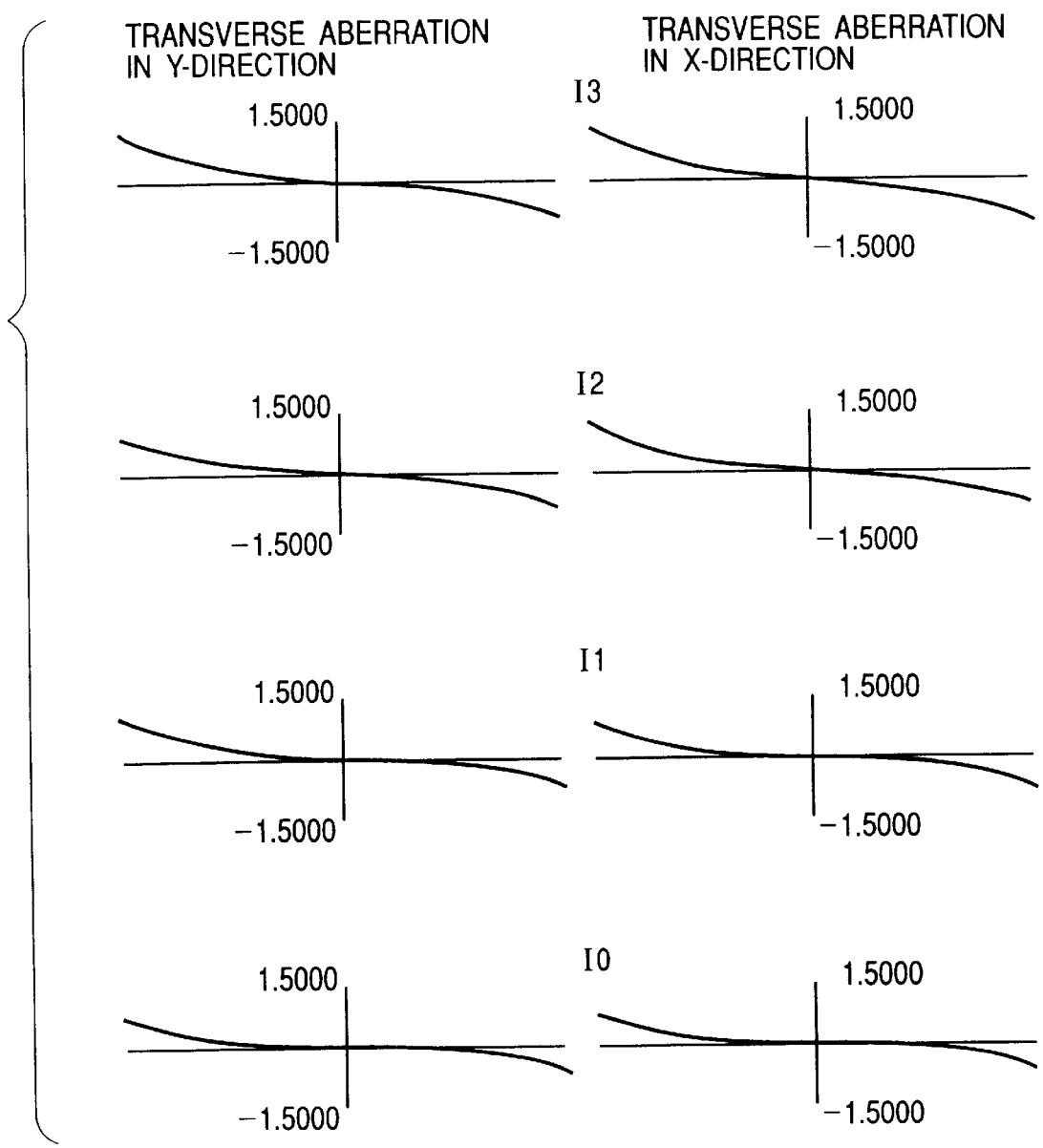
FIG. 5 is an aberration diagram of the relay lens system of FIG. 4.
Figure 6:
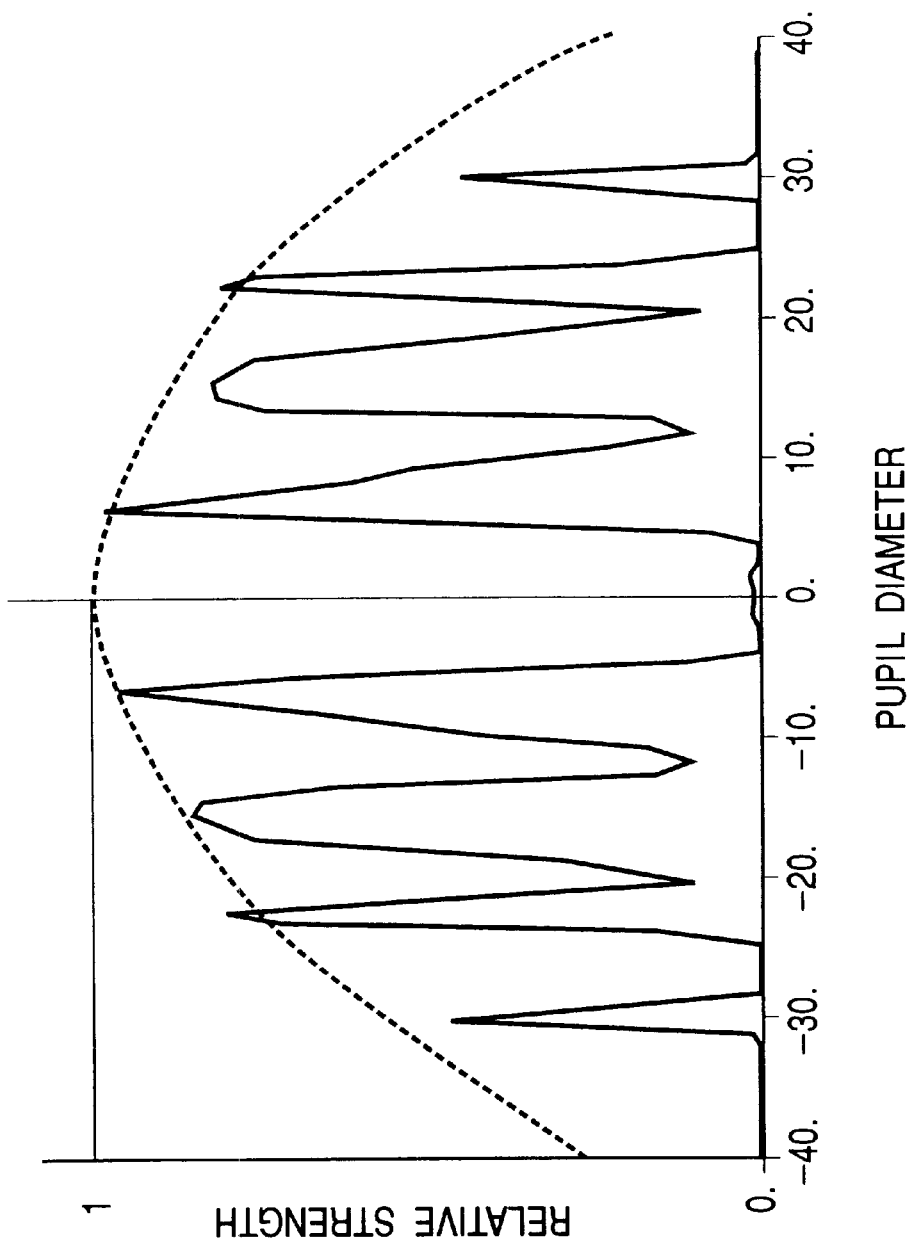
FIG. 6 is an explanatory diagram to explain the intensity distribution on the entrance pupil of the relay lens system.

FIG. 5 shows an aberration diagram of transverse aberration in the lateral direction (the x-direction) and in the vertical direction (the y-direction) of the liquid crystal display element against the object at infinity, which is caused by the relay lens system RL composed of the condenser lens 5 and the condenser lens 6 in the present numeral example. Now let us compute transverse aberration amounts of the relay lens system RL from Eqs. (7), (8) in consideration of the light intensity distribution on the entrance pupil of the relay lens system RL. The entrance pupil of the relay lens system RL is a light entrance plane of the lens 1 of the condenser lens 5 and the light intensity distribution on the entrance pupil is thus an intensity distribution on the light entrance plane of the lens 1 of the condenser lens 5. An actual intensity distribution of incident light at the lens 1 of the condenser lens 5 is the intensity distribution (solid line) as illustrated in FIG. 6, based on the beams condensed by the first lens array 3. Since the transverse aberration is smoothly continuous as to the pupil, the actual light intensity distribution at the entrance pupil can also be assumed to be a smoothly approximate curve (the dashed line in FIG. 6), and the transverse aberration amounts are computed using this approximate distribution. From Eqs. (5), (6) the transverse aberration amounts at the respective image heights are computed as follows.

δ2x=0.676 mm
δ3x=0.791 mm
δ1y=0.545 mm
δ3y=0.746 mm

The maximums in the lateral direction and in the vertical direction, δx and δy, are thus determined as follows.

δx=0.791 mm
δy=0.746 mm

Here the focal length ff2 of the lenses 41 forming the second lens array 4 and the focal length fr of the relay lens system RL are given as follows from the lens data.

ff2=48.3 mm
fr=168.9 mm

Assuming that the diagonal length of the liquid crystal display element is 1.3 inches and the aspect ratio is 3:4, the lateral length Dpx and the vertical length Dpy of the liquid crystal display element are obtained as follows.

Dpx=26.41 mm
Dpy=19.82 mm

From these data, the size of the lenses 31 forming the first lens array 3 is set as follows from Eqs. (7), (8), where the lateral lengths are Dfx, Dfy.

Dfx>7.78 mm
Dfy>5.88 mm

Figure 7:
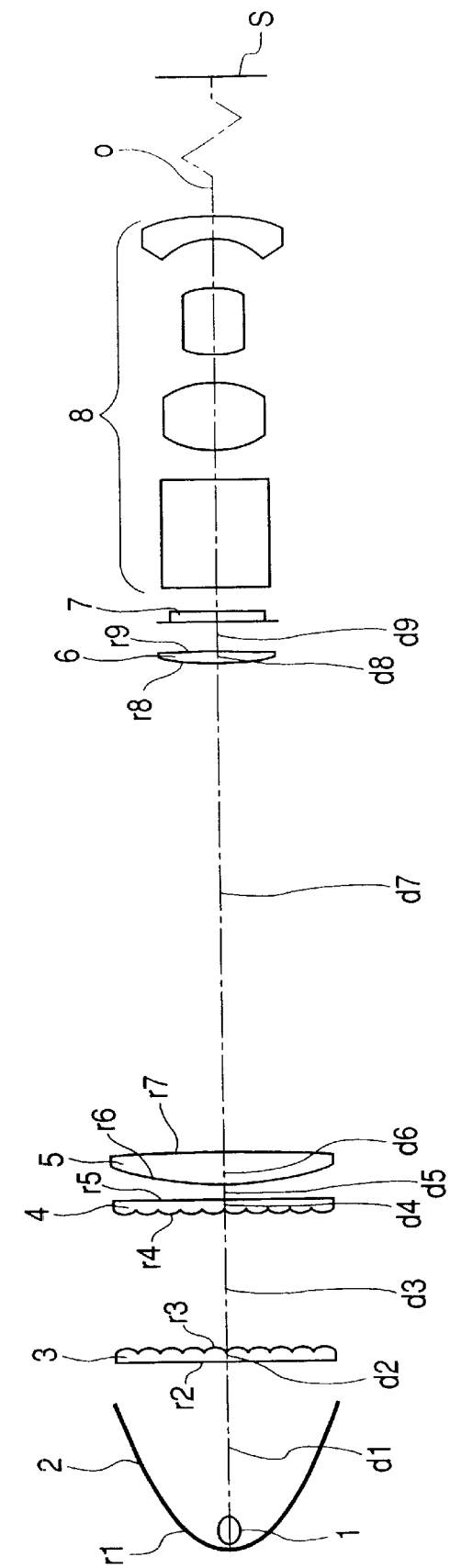
FIG. 7 is a schematic diagram to show the major part of Embodiment 3 of the present invention.

FIG. 7 is a schematic diagram to show the major part of Embodiment 3 of the present invention, and shows a liquid crystal projector. Embodiment 3 is different from Embodiment 1 of FIG. 1 only in that the liquid crystal display element is displaced from the paraxial image point position of the relay lens system to a position closer to the light source, and the other structure is the same. Lens data in a numerical example of Embodiment 3 is presented in Table-3.

TABLE 3

| reflector | | | | | |
|---|---|---|---|---|---|
| r1 | 14 | d1 | 65.14 | n1 | reflection |
| k1 | −1 | | | | |
| first lens array | | | | | |
| r2 | 0 | d2 | 3 | n2 | 1.516 |
| r3 | −25 | d3 | 48.29 | | |
| second lens array | | | | | |
| r4 | 25 | d4 | 3 | n4 | 1.516 |
| r5 | 0 | d5 | 5 | | |
| condenser lens 5 | | | | | |
| r6 | 117.553 | d6 | 11 | n6 | 1.516 |
| r7 | −757.494 | d7 | 170 | | |
| condenser lens 6 | | | | | |
| r8 | 98 | d8 | 4 | n8 | 1.516 |
| r9 | 0 | d9 | 12 | | |

Figure 8:
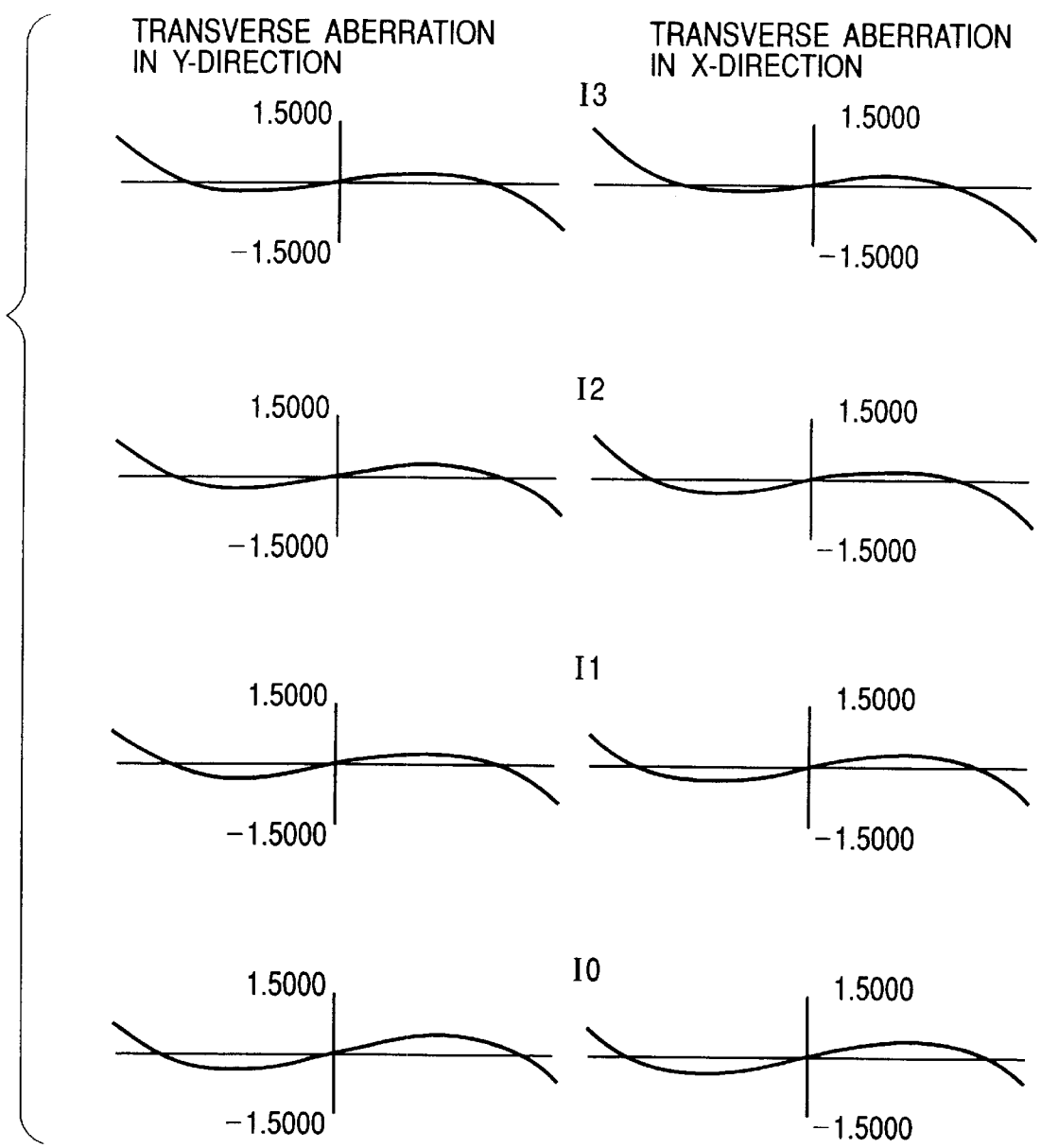
FIG. 8 is an aberration diagram of the relay lens system of FIG. 7.

In this example the transverse aberration in the periphery of the screen can be decreased by displacing the liquid crystal display element by 4.61 mm along the optical axis direction toward the light source. On the liquid crystal display element at this position, the transverse aberration appears as illustrated in FIG. 8, at the point 10 on the optical axis, at the vertical edge I1, at the lateral edge I2, and at the diagonal edge I3. Here let the transverse aberration amounts in the lateral direction and in the vertical direction at the vertical edge I1, at the lateral edge I2, and at the diagonal edge I3 be δ2x, δ3x, δ1y, δ3y, and then they are obtained as follows.

δ2x=1.924 mm
δ3x=2.175 mm
δ1y=1.604 mm
δ3y=2.042 mm

The maximums in the lateral direction and in the vertical direction, δx and δy, are thus determined as follows.

δx=2.175 mm
δy2.042 mm

Here the focal length ff2 of the lenses 41 forming the second lens array 4 and the focal length fr of the relay lens system RL are given as follows from the lens data.

ff2=48.3 mm
fr=177.6 mm

Assuming that the diagonal length of the liquid crystal display element is 1.3 inches and the aspect ratio is 3:4, the lateral length Dpx and the vertical length Dpy of the liquid crystal display element are calculated as follows.

Dpx=26.41 mm
Dpy=19.82 mm

From these data, the size of the lenses 31 forming the first lens array 3 is set as follows from Eqs. (15), (16), where the lateral lengths are Dfx, Dfy.

Dfx>7.98 mm
Dfy>6.10 mm

Figure 9:
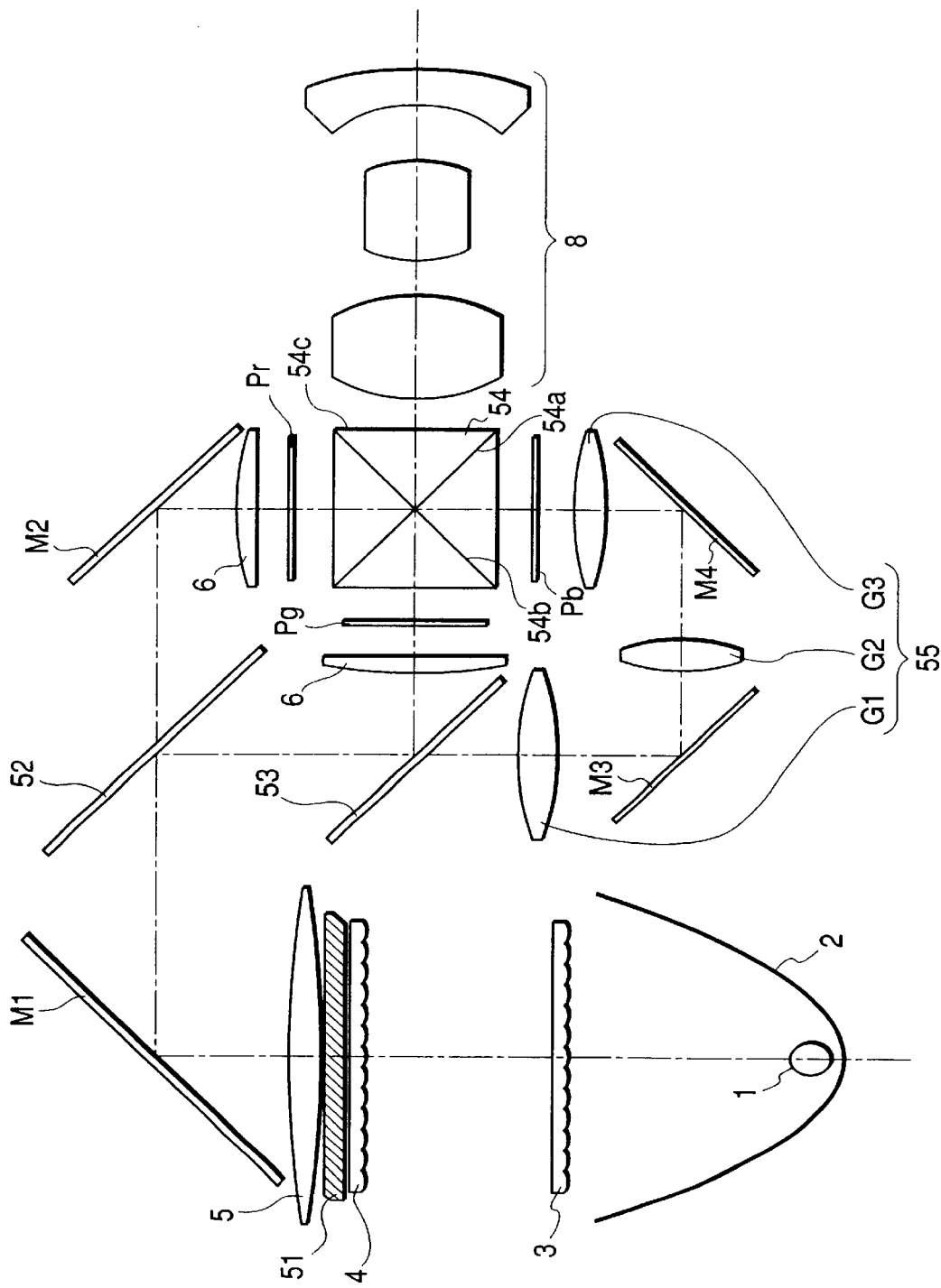
FIG. 9 is a schematic diagram to show the major part of Embodiment 4 of the present invention.

FIG. 9 is a schematic diagram to show the major part of Embodiment 4 of the present invention. FIG. 9 is an example of application of the present invention to a color liquid crystal projector of the three panel type.

In the figure, reference numeral 1 designates a light source, such as a metal halide lamp or the like, for radiating white light, and 2 a reflector having a concave reflecting surface, such as an ellipsoidal surface, a parabolic surface, or the like, for efficiently reflecting the light from the light source 1. The reflector 2 illustrated, which is a parabolic mirror, reflects the light from the light source 1 to convert it into parallel light and makes this parallel light incident into the first lens array 3. The first lens array 3 has a plurality of lenses each having a positive refracting power. Numeral 4 denotes a second lens array, and individual lenses of this lens array 4 are lenses having a positive refracting power and arranged in 1:1 correspondence to the individual lenses of the first lens array 3. Each of the first and second lens arrays is a lens array plate in which the front shape of the individual lenses is similar to the illuminated area of the display elements P.

Figure 11:
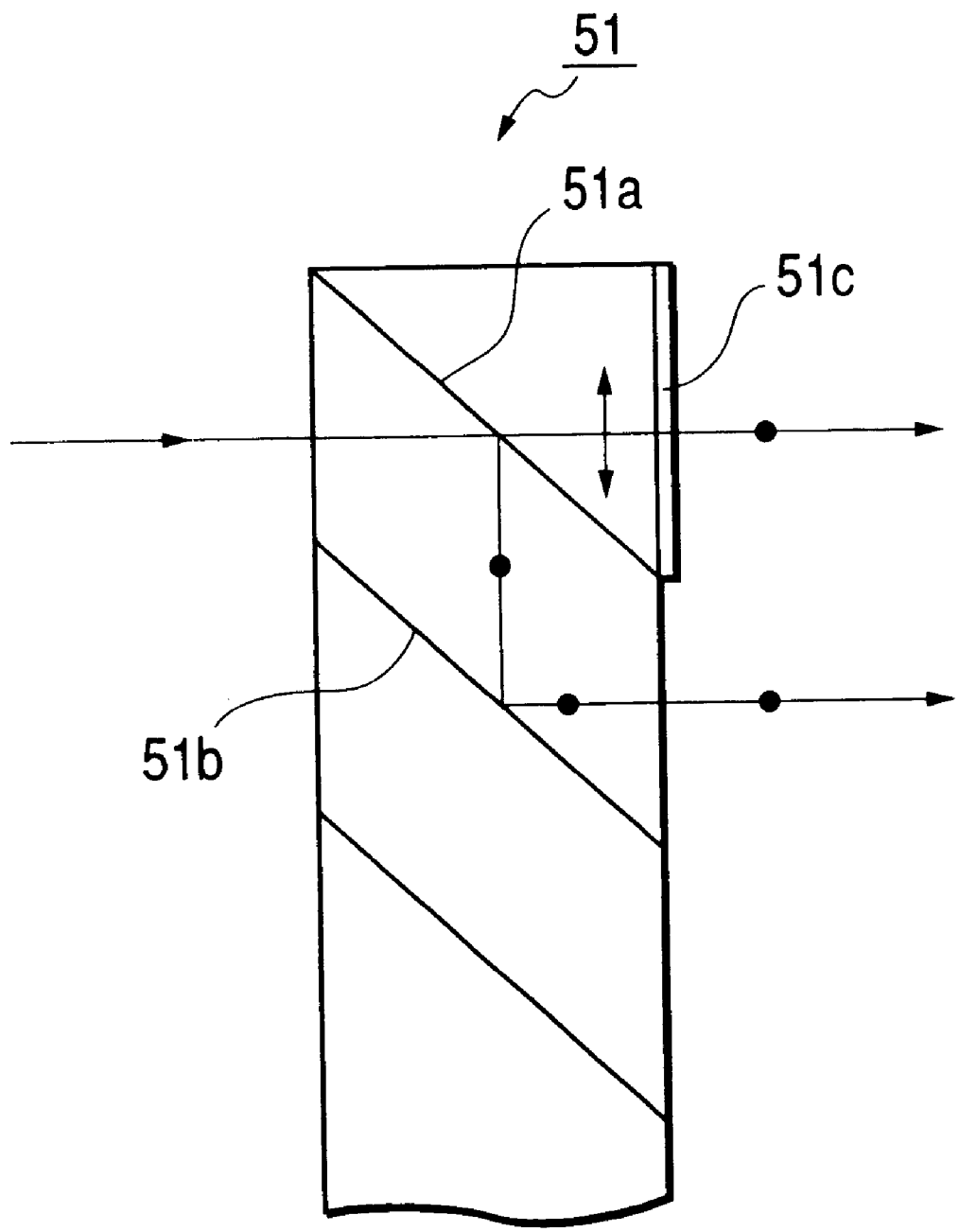
FIG. 11 is an explanatory diagram of a polarization converting element array of FIG. 9.
Figure 12:
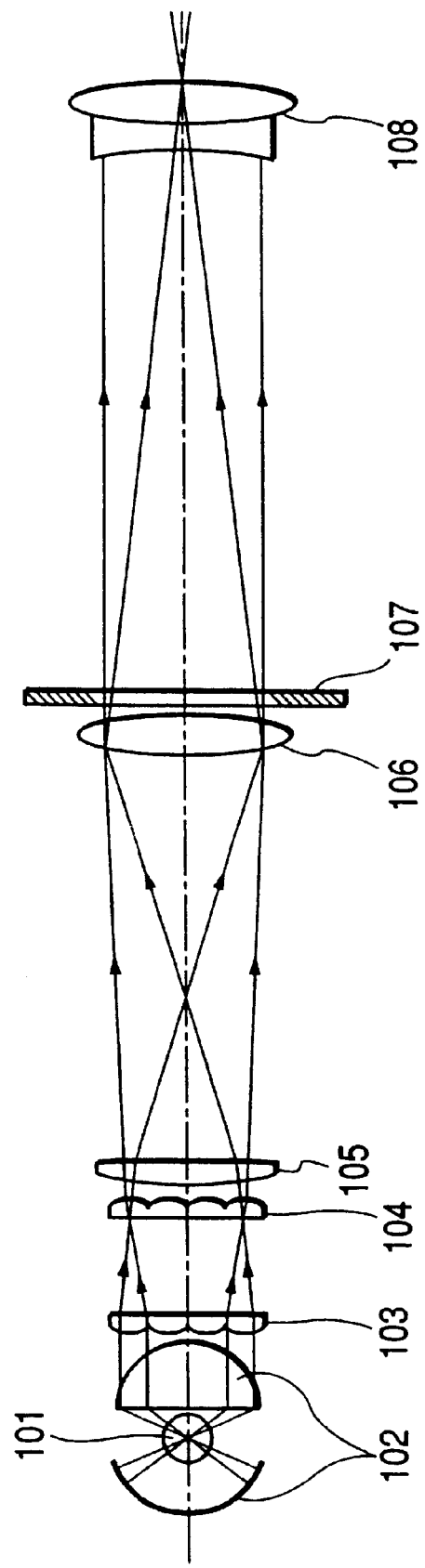
FIG. 12 is an explanatory diagram to explain the conventional projection apparatus.

Numeral 51 designates a polarization converting element array, which has the structure illustrated in FIG. 11 and which converts non-polarized light (randomly polarized lightincident to each polarization converting element, into linearly polarized light polarized in a specific direction.

L1nearly polarized light beams emerging from the respective polarization converting elements have the identical polarization direction, as illustrated in FIG. 11. Numeral 5 denotes a condenser lens which has a positive refracting power. M1 to M4 represent mirrors.

Numeral 52 indicates a dichroic mirror which transmits the red light but reflects the light of the colors of green and blue, and 53 a dichroic mirror which transmits the blue light but reflects the green light. Numeral 55 denotes a relay lens system according to the present invention, and the embodiment of FIG. 9 shows an example of the relay lens system consisting of three lenses (lens group) G1, G2, G3. Numeral 6 denotes condenser lenses, each of which condenses the illumination light through the liquid crystal display element Pr or Pg onto the entrance pupil of the projection lens 8. The condenser lens 5 and the condenser lens 6 compose the first relay lens system. Pr represents the liquid crystal display element (LCD) for red, Pg that for green, and Pb that for blue.

Numeral 54 designates a color combining means, which has dichroic films 54a, 54b inside and which combines image beams of the three colors from the three liquid crystal display elements Pr, Pg, Pb to output composite light from a light exit surface 54c. Numeral 8 indicates the projection lens, which enlarges and projects the images (beams) of the respective colors displayed on the liquid crystal display elements Pr, Pg, Pb and combined by the color combining means 54, onto the screen or wall.

The structure of the polarization converting element array 51 will be described referring to FIG. 11. The polarization converting elements of the polarization converting element array 51 are provided corresponding to the individual lenses of the second lens array 4, and each of these elements has a polarization separating surface 51a, a reflecting surface 51b for bending an optical path of s-polarized light reflected by the polarization separating surface 51a, and a quarter wave plate 51c provided in an optical path of p-polarized light transmitted by the polarization separating surface 51a. Based on this structure, the emergent beams are outputted in an aligned polarization state.

In the present embodiment, as to the illumination optical paths of the respective colors of the red light, the green light, and the blue light, the path lengths of the green light and red light are equal, but the path length of the blue light is longer than those of the other two color beams. Thus the present embodiment employs the second relay lens system 55. In the illumination system including the second relay lens system 55, where the magnifications of the lens 5 and the second relay lens system 55 concerning the liquid crystal display element Pb are defined as Mr1 and Mr2, respectively, where the total magnification is thus given as Mr=Mr1×Mr2, and where transverse aberration amounts appearing in the optical system including the second relay lens system are represented by δx', δy', the size Dfx', Dfy' of the lenses 31 of the first lens array 3 is set so as to satisfy the following conditions, as in the case of the methods described above.

$$Dfx' > (Dpx+\delta x') \times Mr$$

$$Dfy' > (Dpy+\delta y') \times Mr$$

At this time the relation of Dfx', Dfy' to Dfx, Dfy set as to the liquid crystal display elements Pr, Pg, is desired to be Dfx=Dfx' and Dfy=Dfy'. However, if Dfx'>Dfx and Dfy'>Dfy, from Mr'=Dfx/(Dpx+δx')

or from Mr'=Dfy/(Dpy+δy'), the magnification of the second relay system 55 is set so as to satisfy the following.

$$Mr2 = Mr'/Mr1$$

The projectors described above employed the liquid crystal display elements as light modulating elements, but it is also noted that the present invention can also be applied to projectors using light modulating elements of the other birefringent substances than the liquid crystals or of the other structure, as display elements.

The above embodiments can accomplish the projection apparatus capable of uniformly illuminating the illuminated surface readily and capable of projecting the image information formed in the light modulating element set on the illuminated surface, onto the predetermined surface.

This enables the effective range of the display element to be illuminated with the light having the uniform light intensity distribution in such a manner that the optical design is carried out without positively effecting proper correction for the transverse aberration in consideration to the transverse aberration of the optical system in the illumination system, so as to drive the portion causing the illuminance nonuniformity in the periphery of the illumination light out of the effective range of the display element in the above embodiments, thereby providing the liquid crystal projectors capable of projecting the image with high quality.

In the foregoing embodiments, the cross dichroic prism as the color combining means may be replaced with a system as used for the color separating means in which a plurality of dichroic mirrors are parallelly arranged, a system in which a plurality of prisms are combined as disclosed in Japanese Patent No. 2,505,758, or the like.

Further, in the foregoing embodiments, one set of the flyeye lenses constituting the first and second lens arrays for forming a plurality of secondary light sources may be replaced with a system comprising a light pipe (rod integrator) and a lens from which a plurality of beams emerge to be overlapped on a surface to be illuminated.

What is claimed is:

1. An illumination apparatus for illuminating an area to be illuminated, of a rectangular shape with light from a light source via a first lens array, a second lens array, and a condensing optical system arranged in the stated order from the side of the light source, said illumination apparatus satisfying the following conditions:

$$Dfx > (Dpx+\delta x) \times ff2/fr$$

$$Dfy > (Dpy+\delta y) \times ff2/fr$$

where Dpx is a length along a longitudinal direction of said area to be illuminated, Dpy is a length along a transverse direction thereof, ff2 is a focal length of individual lenses forming the second lens array, fr is a focal length of said optical system, δx is a width of transverse aberration in said longitudinal direction against an object at infinity, caused by said optical system, δy is a width of transverse aberration in said transverse direction, caused by said optical system, Dfx is a length along a longitudinal direction of individual lenses of the first lens array, and Dfy is a length along a transverse direction of the lenses of the first lens array.

2. A projection apparatus wherein a display element with said surface to be illuminated is illuminated by the illumination apparatus as set forth in claim 1 and wherein an image formed by the element is projected by a projection optical system.

3. An illumination apparatus for illuminating an area to be illuminated, of a rectangular shape with light from a light source via a first lens array, a second lens array, and a condensing optical system arranged in the stated order from the side of the light source, said illumination apparatus satisfying the following conditions:

$$Dfx > (Dpx+\delta x) \times Sr$$

$$Dfy > (Dpy+\delta y) \times Sr$$

where Dpx is a length along a longitudinal direction of said area to be illuminated, Dpy is a length along a transverse direction thereof, Sr=L2/L1 wherein L1 is a distance from the first lens array to a position of a principal point on the side of said light source, of a composite system of the second lens array and the condensing optical system and L2 is a distance from a position of a principal point on the side of said area to be illuminated, of said composite system to said area to be illuminated, ax is a width of transverse aberration in said longitudinal direction against an object at infinity, caused by said condensing optical system, δy is a width of transverse aberration in said transverse direction, caused by said condensing optical system, Dfx is a length along a longitudinal direction of individual lenses of the first lens array, and Dfy is a length along a transverse direction of the lenses of the first lens array.

4. A projection apparatus wherein a display element with said surface to be illuminated is illuminated by the illumination apparatus as set forth in claim 3 and wherein an image formed by the element is projected by a projection optical.

5. An illumination apparatus for illuminating an area to be illuminated, of a rectangular shape with light from a light source via a first lens array, a second lens array, and a condensing optical system arranged in the stated order from the side of the light source, wherein when weighted mean widths of transverse aberration are computed by the following equations:

$$\overline{\delta x} = 2\left(\frac{\sum_i \delta xi^2 \cdot Epi}{\sum_i Epi}\right)^{1/2}$$

$$\overline{\delta y} = 2\left(\frac{\sum_j \delta yj^2 \cdot Epj}{\sum_j Epj}\right)^{1/2}$$

where δx is a width of transverse aberration in said longitudinal direction against an object at infinity, caused by said optical system, δy is a width of transverse aberration in said transverse direction, caused by said optical system, Ep is a normalized intensity distribution at an entrance pupil of said optical system, δxi is a transverse aberration amount of a ray passing a center of the i-th lens, when counted from an end in said longitudinal direction, out of individual lenses forming said first lens array at the time of incidence to the pupil of said condensing optical system, δyj is a transverse aberration amount of a ray passing a center of the j-th lens in the transverse direction out of the individual lenses forming the first lens array at the time of incidence to the pupil of said condensing optical system, and Epi and Epj are intensities of the pupil at respective pupil positions where the transverse aberration amounts δxi, δyj are computed;

a length Dfx along a longitudinal direction and a length Dfy along a transverse direction of the individual lenses of said first lens array satisfy the following conditions:

$Dfx > (Dpx + \overline{\delta x}) \times ff2/fr$ $Dfy > (Dpy + \overline{\delta y}) \times ff2/fr$, where Dpx is a length along a longitudinal direction of said area to be illuminated, Dpy is a length along a transverse direction thereof, ff2 is a focal length of individual lenses forming the second lens array, fr is a focal length of said optical system.

6. A projection apparatus wherein a display element with said surface to be illuminated is illuminated by the illumination apparatus as set forth in claim 5 and wherein an image formed by the element is projected by a projection optical system.

7. An illumination apparatus for illuminating an area to be illuminated, of a rectangular shape with light from a light source via a first lens array, a second lens array, and a condensing optical system arranged in the stated order from the side of the light source, wherein when weighted mean widths of transverse aberration are computed by the following equations:

$$\overline{\delta x} = 2\left(\frac{\sum_i \delta xi^2 \cdot Epi}{\sum_i Epi}\right)^{1/2}$$

$$\overline{\delta y} = 2\left(\frac{\sum_j \delta yj^2 \cdot Epj}{\sum_j Epj}\right)^{1/2}$$

where δx is a width of transverse aberration in said longitudinal direction against an object at infinity, caused by said condensing optical system, δy is a width of transverse aberration in said transverse direction, caused by said condensing optical system, Ep is a normalized intensity distribution at an entrance pupil of said optical system, δxi is a transverse aberration amount of a ray passing a center of the i-th lens, when counted from an end in said longitudinal direction, out of individual lenses forming said first lens array at the time of incidence to the pupil of said condensing optical system, δyj is a transverse aberration amount of a ray passing a center of the j-th lens in the transverse direction out of the individual lenses forming the first lens array at the time of incidence to the pupil of said condensing optical system, and Epi and Epj are intensities of the pupil at respective pupil positions where the transverse aberration amounts δxi, δyj are computed;

a length Dfx along a longitudinal direction and a length Dfy along a transverse direction of the individual lenses of said first lens array satisfy the following conditions:

$Dfx > (Dpx + \overline{\delta x}) \times Sr$ $Dfy > (Dpy + \overline{\delta y}) \times Sr$, where Dpx is a length along a longitudinal direction of said area to be illuminated, Dpy is a length along a transverse direction thereof, Sr=L2/L1 wherein L1 is a distance from the first lens array to a position of a principal point on the side of said light source, of a composite system of the second lens array and the condensing optical system and L2 is a distance from a position of a principal point on the side of said area to be illuminated, of said composite system to said area to be illuminated.

8. A projection apparatus wherein a display element with said surface to be illuminated is illuminated by the illumination apparatus as set forth in claim 7 and wherein an image formed by the element is projected by a projection optical system.

9. An illumination apparatus for illuminating an effective range of a surface to be illuminated, with a plurality of beams, which are superimposed on said surface, wherein said effective range is so illuminated as to cause light on a portion of illumination nonuniformity caused by relative deviation among illumination areas illuminated by the respective beams to be directed toward a noneffective range of said surface, said deviation occurring because of transverse aberration of an optical system.

10. A projection apparatus wherein a display element with said effective range is illuminated by the illumination apparatus as set forth in claim 9 and wherein an image formed by the element is projected by a projection optical system.

11. An illumination apparatus for illuminating an effective range of a surface to be illuminated, with a plurality of beams, which are superimposed on said surface, wherein said effective range is so illuminated as to cause light on a portion of illumination nonuniformity caused by relative deviation among illumination areas illuminated by the respective beams to be directed toward a non-effective range of said surface.

12. A projection apparatus wherein a display element with said effective range is illuminated by the illumination apparatus as set forth in claim 11 and wherein an image formed by the element is projected by a projection optical system.

13. An illumination apparatus for illuminating an effective range of a surface to be illuminated, of a rectangular shape with light from a light source via a first lens array, a second lens array, and a condensing optical system arranged in the stated order from the side of the light source, wherein said effective range is so illuminated as to cause light on a portion of illumination nonuniformity caused by relative deviation among illumination areas illuminated by respective lenses of said first lens array to be directed toward a non-effective range of said surface.

14. A projection apparatus wherein a display element with said effective range is illuminated by the illumination apparatus as set forth in claim 13 and wherein an image formed by the element is projected by a projection optical system.

* * * * *

UNITED STATES PATENT AND TRADEMARK OFFICE
CERTIFICATE OF CORRECTION

PATENT NO. : 6,457,832 B1
DATED : October 1, 2002
INVENTOR(S) : Atsushi Okuyama

It is certified that error appears in the above-identified patent and that said Letters Patent is hereby corrected as shown below:

Column 12,
Line 54, "lightincident" should read -- light) incident --
Line 56, "L1nearly" should read -- Linearly --

Column 15,
Line 8, "illuminated, ax is" should read -- illuminated, δx is --
Line 19, "projection optical." should read -- projection optical system. --

Signed and Sealed this

Third Day of June, 2003

JAMES E. ROGAN
*Director of the United States Patent and Trademark Office*